United States Patent [19]
Thomson et al.

[11] Patent Number: 5,568,282
[45] Date of Patent: Oct. 22, 1996

[54] ROTARY DRUM SCANNER

[75] Inventors: Graham A. Thomson, London; Peter J. Neilson; Paul C. Cook, both of Gloucestershire, all of United Kingdom

[73] Assignee: Itek Colour Graphics, LTD., Gloucestershire, United Kingdom

[21] Appl. No.: 286,202

[22] Filed: Aug. 5, 1994

[30] Foreign Application Priority Data

Aug. 6, 1993 [GB] United Kingdom .............. 9316354

[51] Int. Cl.$^6$ .................................................. H04N 1/08
[52] U.S. Cl. ........................................ 358/489; 358/490
[58] Field of Search .................................. 358/489–493; H04N 1/08, 1/17

[56] References Cited

U.S. PATENT DOCUMENTS 4,870,504  9/1989  Ishida et al. .......................... 358/489
5,223,956  1/1993  Kramer et al. .

FOREIGN PATENT DOCUMENTS 9316355  of 0000  United Kingdom .
380661   9/1932   United Kingdom .
658956   10/1951  United Kingdom .
677040   8/1952   United Kingdom .
763758   12/1956  United Kingdom .

*Primary Examiner*—Kim Yen Vu
*Attorney, Agent, or Firm*—Donald C. Casey

[57] ABSTRACT

A compact rotary drum colour separation scanner includes a drum which is rotatably mounted about an upwardly extending axis which is preferably slightly inclined to the vertical. A part of the carriage carrying either a light source or reading head travels into the drum through the hub upon which the drum is mounted.

7 Claims, 2 Drawing Sheets

ROTARY DRUM SCANNER

BACKGROUND OF THE INVENTION

This invention relates to a rotary drum colour separation scanner for use in graphic reproduction.

Modern methods of producing posters and other graphic works require that a transparency is electronically scanned and colour and shade information stored in digital form. One type of scanner comprises a transparent drum which is rotatably mounted about a horizontal axis and upon which the transparency is mounted. The drum is rotated while a carriage holding a co-operating light source and reading head moves linearly on opposing sides of the transparency to capture the picture information. Traditionally such scanners have been used in a printing room environment where space is not at a premium and are housed in large rectangular box-like casings. The present invention is based upon the appreciation that a need exists for a compact scanner in particular for use in modern P.C. based "desk-top" publishing.

BRIEF SUMMARY OF THE INVENTION

Accordingly a rotary drum colour separation scanner is provided in which the drum is detachably mounted to a hub rotatably mounted about an upwardly extending axis, the scanner further comprising a carriage upon which a light source and a reading head are mounted, a part of the carriage being movable upwardly into and downwardly out of the drum. Because of the disposition of the drum, a scanner occupying little floor area can be provided, as compared to the known scanners. This makes such a scanner particularly suitable for use in a crowded office environment where it can be stood unobtrusively next to an operators desk. Such an arrangement also ensures that the drum, which is detachable, can be mounted at substantially chest height of an average sized operator, making the scanner particularly easy to use. The working envelope for the carriage can then be located below that without making the overall height of the scanner too great.

It is preferred that the drum is mounted about an axis which is at a small angle away from the vertical-typically about 15°. It has been found that inclining the drum in this way ensures that the scanner is ergonomically easy to use. For example users having a wide range of heights can easily inspect visually transparencies placed upon such a drum and can also detach and re-attach the drum with ease.

It is also much preferred that one arm of the carriage carrying either the light source or the reading head passes through the hub upon which the drum is detachably mounted. This again can increase the compactness of a scanner and is of special use when the drum is substantially vertically disposed. However, this invention also provides a scanner incorporating this feature irrespective of the orientation of the drum.

BRIEF DESCRIPTION OF THE DRAWINGS

In order that the invention may be well understood, an embodiment thereof will now be described with reference to the accompanying diagrammatic drawings, in which.

DETAILED DESCRIPTION OF THE PREFERRED EMBODIMENT

Figure 1:
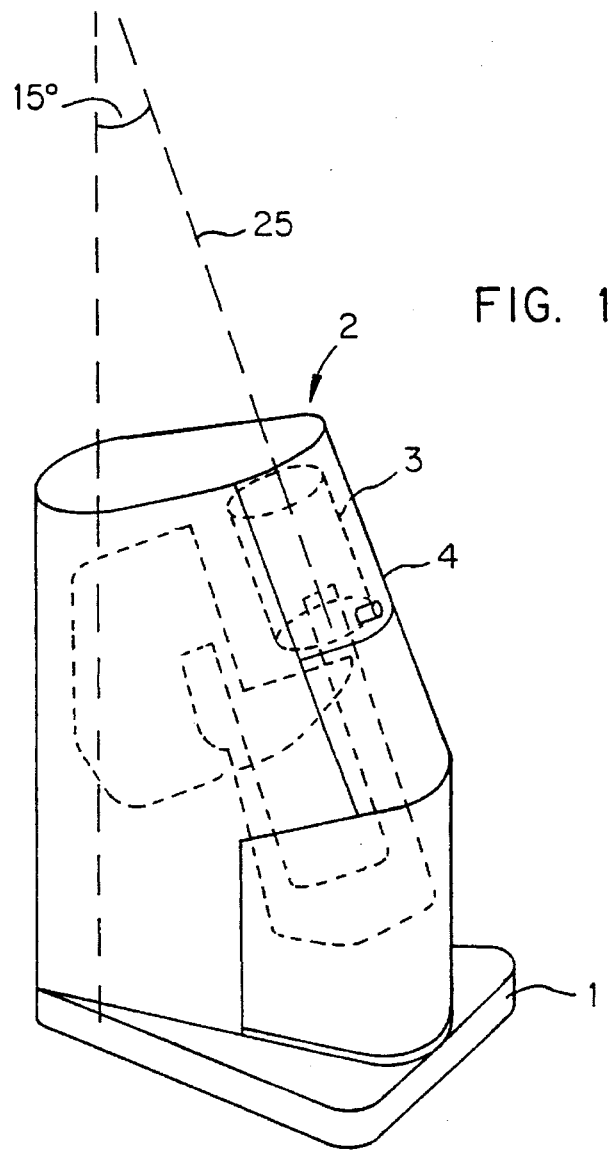
FIG. 1 is a perspective view of the outside of a scanner according to the invention.

FIG. 1 shows a rotary drum colour separation scanner comprising a horizontal base 1 upon which is mounted a casing 2 housing the scanning assembly 3, shown in dotted outline. A lid 4 allows access to the transparent drum of the assembly. The scanner has a relatively small footprint and thus takes up little floor space, has a narrow width and has a depth similar to that of a desk, making it particularly suitable to be stood alongside the desk of an operator within an office.

Figure 3:
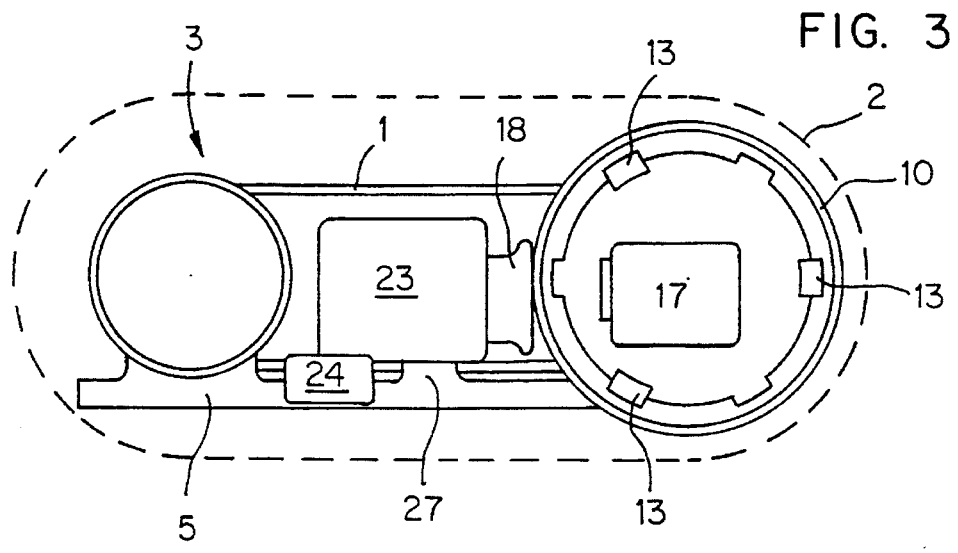
FIG. 3 is a top plan view of the assembly shown in FIG. 2 in the direction of arrow A.
Figure 2:
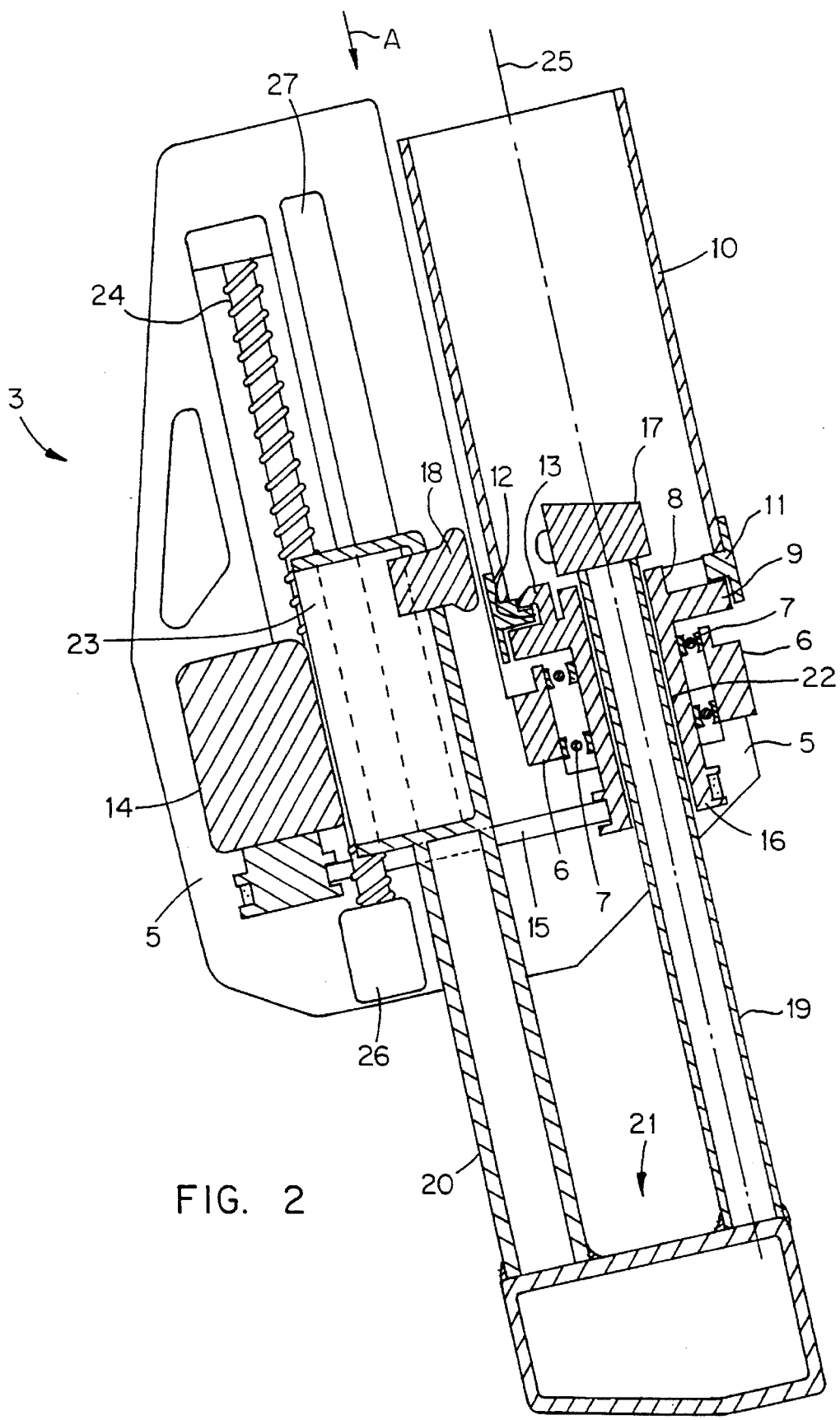
FIG. 2 is a partly schematic, partly vertical section through the working assembly of the scanner shown in FIG. 1.

As shown in FIGS. 2 and 3 the scanning assembly 3 comprises a substantially planar backing plate or chassis 5 which provides a support for the remaining components and is preferably formed from a metal casting. The chassis 5 includes a ring shaped portion 6 housing bearing assemblies 7 to allow rotation of a generally cylindrical hub 8 about an axis 25. The hub 8 includes an outwardly extending flange 9 upon which a transparent plastics drum 10 is detachably mounted. The drum 10 includes a mounting ring 11 including formations 12 which co-operate with lugs 13 provided on the flange 9 to provide a bayonet-type coupling. The coupling is much simplified as shown and is preferably of the type disclosed in co-pending patent application GB 9316355.8 also in the name of Itek Colour Graphics Ltd.

The hub 8 is rotated, in use, by means of an electric motor 14 which is mounted towards the other side of the chassis 5 and drives a belt 15 engaging to a pulley wheel 16 at the base of the hub.

A light source 17 and a reading head 18 are mounted on respective arms 19, 20 of a generally U-shaped carriage 21. One arm 19 of the carriage 21 extends through a coaxial bore 22 in the hub 8 and into the base of the drum 10, where the light source 17 is located. The other arm 20 includes a nut, indicated in simplified form at 23, for a ball screw 24 parallel to the rotational axis 25 of the drum. The ball screw 24 is driven by an electric motor 26 which, in use, drives the carriage 21 up and down as the drum 10 is rotating. The reading head 18 and nut 23 are supported by a slide 27 mounted on the chassis 5 between the ball screw 24 and the drum 10.

The assembly 3 shown in FIGS. 2 and 3 is mounted within the casing 2 such that the rotational axis 25 is inclined at a small angle away from the vertical. A preferred angle is about 15°. The scanner has a height of about 5 feet (1.5 meters) and this, when combined with the inclined condition of the drum ensures that users having a wide range of heights can easily inspect any transparencies mounted upon the drum. The chassis 5 is also disposed in a substantially vertical plane so that the width of the scanner is essentially determined by the diameter of the drum, as is shown by FIG. 3. The fact that an arm 19 of the carriage passes through the hub 8 is advantageous since it allows the hub flange 9 to be disposed at approximately waist height, supporting the weight of the drum 10 during attachment. Because the carriage travels upwardly into the drum this again ensures that the drum can be mounted at approximately chest height, with clearance being provided below that to permit travel of the carriage.

In alternative embodiments the hub assembly could be mounted at the top of the scanner, with the arm 19 of the carriage then being driven into and out of the open end of the drum. This would simplify the construction of the hub assembly and obviate the need to provide the bore 22 within the hub. However such an arrangement is not as easy to use since the operator would have to support the entire weight of the drum during attachment. Furthermore this would also increase the overall height of the scanner.

We claim:

1. A rotary drum color separation scanner for scanning an image from a transparency comprising:

a transparent cylindrical drum to which the transparency is mountable;

means for rotatably mounting the drum about its longitudinal axis, wherein said axis is arranged to be vertical or close to vertical:

means for rotating the drum about said axis:

a carriage:

a light source and a reading head wherein the light source and reading head are mounted on the carriage, and a part of said carriage, carrying either the light source or the reading head, is movable into and out of said drum.

2. A scanner, according to claim 1, in which the drum is rotatably mounted about an axis which is at a small angle to the vertical.

3. A scanner, according to claim 1, in which said axis is arranged to be at an angle of about 15 degrees to the vertical.

4. A scanner, according to claim 1, in which the means for rotatably mounting the drum comprises:

a hub to which the drum is detachably mounted and means for defining a passage in said hub, said passage being arranged to run along said axis, said scanner further comprising means for moving said part of said carriage into, and out of, the drum through said passage in the hub.

5. A scanner, according to claim 1, in which the hub and the carriage are mounted upon a chassis which is disposed in a substantially vertically plane.

6. A rotary drum color separation scanner for scanning an image from a transparency comprising:

a cylindrical drum to which the transparency is mountable:

a hub rotatably mounting the drum to rotate about its longitudinal axis:

means for defining a passage in said hub, said passage being arranged to run along said axis:

means for rotating the drum about said axis:

a carriage:

a light source and reading head wherein the light source and reading head are mounted on said carriage and means for moving said a part of said carriage carrying either the light source or the reading head into, and out of, the drum through said passage in the hub.

7. A rotary drum color separation scanner, according to claim 6, wherein said hub is oriented such that said axis of rotation is vertical or nearly vertical.

\* \* \* \* \*